(No Model.)
R. P. PALMENBERG.
STORE FIXTURE BRACKET.
No. 517,190. Patented Mar. 27, 1894.
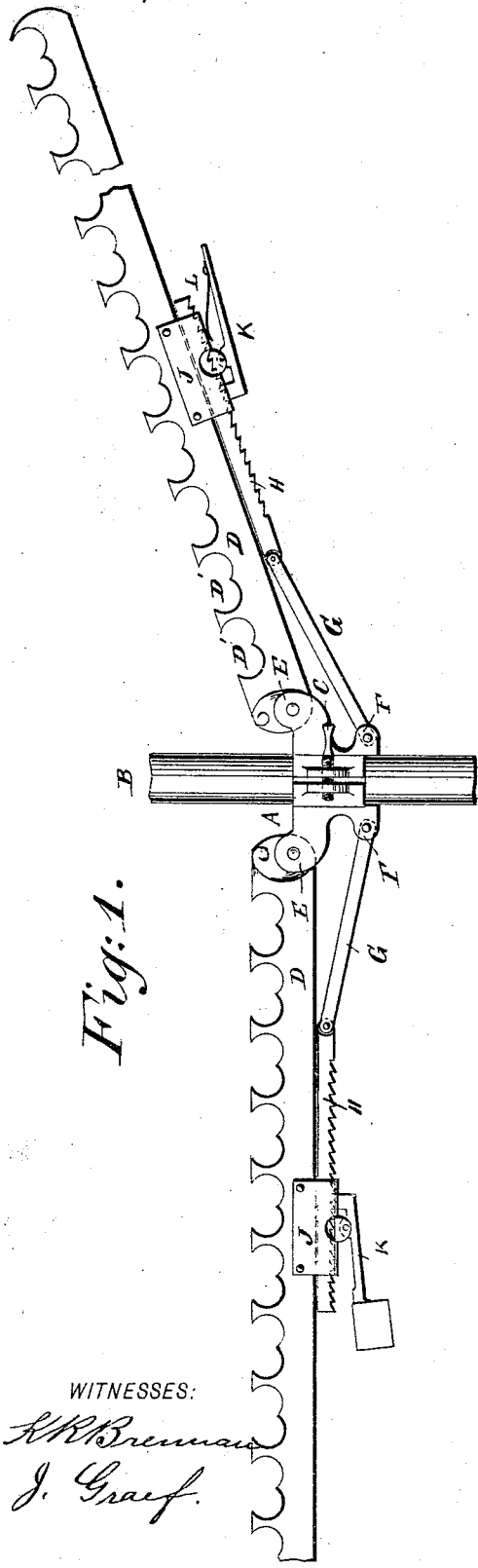
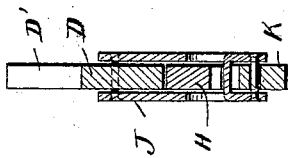
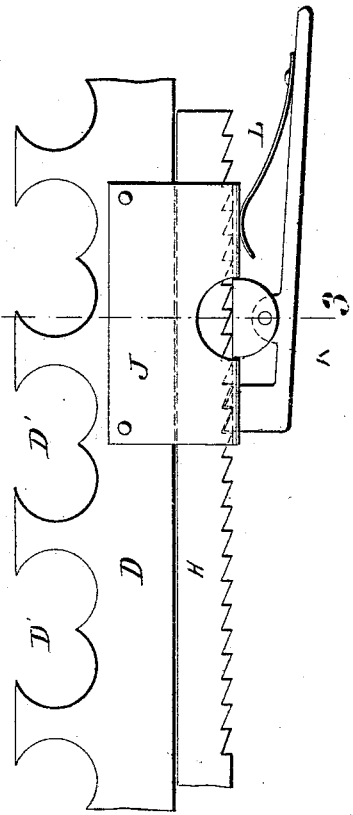
WITNESSES:
INVENTOR
R. P. Palmenberg
BY Goepel & Raegener
ATTORNEYS.

UNITED STATES PATENT OFFICE.

RAYMOND P. PALMENBERG, OF NEW YORK, N. Y.

STORE-FIXTURE BRACKET.

SPECIFICATION forming part of Letters Patent No. 517,190, dated March 27, 1894.

Application filed November 14, 1893. Serial No. 490,933. (No model.)

*To all whom it may concern:*

Be it known that I, RAYMOND P. PALMENBERG, a citizen of the United States, and a resident of the city of New York, in the county and State of New York, have invented certain new and useful Improvements in Store-Fixture Brackets, of which the following is a specification.

This invention relates to improvements in store fixture brackets, such as are used in stores and show windows for supporting-rods from which the articles to be displayed are suspended.

The object of my invention is to provide a bracket of this kind, which is simple in construction, strong and durable and may readily be adjusted at any inclination and which is adjusted and held firmly and securely.

In the accompanying drawings Figure 1 shows two of my improved store fixture brackets in side elevation, one being in horizontal position and the other at an inclination and parts being broken out. Fig. 2 is an enlarged detail view of part of the same. Fig. 3 is a vertical transverse sectional view on the line 3—3, Fig. 2.

Similar letters of reference indicate corresponding parts.

The collar A is mounted on the standard B and can be adjusted higher or lower on the same and when at the desired elevation can be locked in place by means of the binding screw C. To the collar A one or more bracket arms D are pivoted, which bracket arms are provided in their upper edges with notches D' for receiving the supporting-rods. The bracket arms D are pivoted to jaws E E on the collar and below the jaws to which the bracket arms are pivoted another set of jaws F projects from the collar. In each pair of said jaws F a connecting-rod G is pivoted, the opposite end of which is pivotally connected with a rack H mounted to slide on the bottom edge of one of the bracket arms and guided in a casing J attached to the bottom of the bracket arm. To the bottom of said casing a pawl lever K is pivoted, one end of which passes through a slot in the bottom of the casing J and engages the teeth of the rack H. A spring L attached to the pawl lever K bears against the under side of the casing and exerts a pressure on the pawl lever in such a manner as to keep the toothed end of the pawl lever engaged with the teeth of the said rack. In place of using a spring for this purpose, the end of the pawl lever can be weighted as shown in the left-hand side of Fig. 1. The bracket arm can be raised to have any desired inclination and is automatically locked in position by the pawl lever. As the bracket arm swings upward the rack H slides in its casing on the under side of the bracket arm in the direction toward the pivot of the bracket arm, the teeth of the pawl lever snapping over the teeth of the rack. When the bracket arm is to be lowered, the end of the pawl-lever is pressed upward, so as to disengage the toothed end of the pawl lever from the rack and permit the bracket arm to swing downward the rack sliding through the casing and on the under side of the bracket arm in the direction toward the outer end of the same. As soon as the pawl is released, it automatically locks the bracket arm at the inclination it has at that moment. The connecting-rod G not only serves for moving the rack, but also acts as a brace for the bracket arm. As there are many teeth in the racks a very fine adjustment of the inclination of the bracket arm can be obtained.

Having thus described my invention, I claim as new and desire to secure by Letters Patent—

1. The combination with a pivoted bracket-arm, of a rack mounted to slide on the same, a pawl on the bracket-arm, engaging the rack and a connecting-rod pivoted to the rack and to the support of the bracket-arm, substantially as set forth.

2. The combination with a collar having lugs, of a bracket-arm pivoted to said lugs, a rack sliding on the bracket-arm, a pawl pivoted on the bracket-arm and engaging said rack and a connecting-rod pivoted to the rack and to said collar, substantially as set forth.

3. The combination with a collar having two sets of lugs, one above the other, of a bracket-arm pivoted to the top sets of lugs, a connecting-rod pivoted to the lower set of lugs, a sliding rack on the bracket-arm, with which sliding rod the connecting-rod is pivotally connected, a guide for said rack on the bottom of said bracket-arm and a pawl on said bracket-arm, engaging the rack, substantially as set forth.

In testimony that I claim the foregoing as my invention I have signed my name in presence of two subscribing witnesses.

RAYMOND P. PALMENBERG.

Witnesses:
OSCAR F. GUNZ,
S. E. SMITH.